United States Patent [19]

Kelly et al.

[11] 4,140,802

[45] Feb. 20, 1979

[54] BARLEY MALT STERILIZATION

[75] Inventors: Vincent J. Kelly; Paul J. Thompson; Wayne J. Smalligan, all of Fremont, Mich.

[73] Assignee: Gerber Products Company, Fremont, Mich.

[21] Appl. No.: 828,589

[22] Filed: Aug. 26, 1977

[51] Int. Cl.$^2$ .............................................. A23L 1/202
[52] U.S. Cl. ...................................... 426/64; 426/331; 426/335
[58] Field of Search ............... 426/309, 310, 331, 335, 426/622, 640, 28, 29, 64; 195/69, 70, 71

[56] References Cited

U.S. PATENT DOCUMENTS

| | | | |
|---|---|---|---|
| 1,992,582 | 2/1935 | Sasaki et al. .......................... | 426/331 |
| 2,383,907 | 8/1945 | Beechem et al. ..................... | 426/335 |
| 2,930,699 | 3/1960 | De Sollanto et al. ................ | 426/331 |
| 3,293,144 | 12/1966 | Kneen et al. .......................... | 195/69 |

FOREIGN PATENT DOCUMENTS 104103  5/1938  Australia .................................. 426/335

OTHER PUBLICATIONS

Chemical Abstract 10635h "Control of Barley Smut with Methyl Alcohol", vol. 67, 1967.

*Primary Examiner*—Raymond N. Jones
*Assistant Examiner*—Elizabeth A. Hatcher
*Attorney, Agent, or Firm*—Townsend and Townsend

[57] ABSTRACT

A process for sterilizing barley malt by subjecting the barley malt to soaking in an aqueous solution of an organic alcohol containing up to three carbon atoms under ambient temperature conditions, followed by removal of the organic alcohol solution and drying of the treated barley malt at low temperatures.

4 Claims, No Drawings

BARLEY MALT STERILIZATION

BACKGROUND OF THE INVENTION

1. Field of the Invention

The present invention relates to the sterilization of barley malt and, more specifically, to a method that utilizes aqueous alcohol to destroy bacteria inherently present in barley malt, while retaining the desirable enzymatic activity thereof. The invention also provides a method for the preparation of a sterile barley malt flour having non-diminished enzyme activity.

The enzymatic activity of barley malt is well known for its industrial applications in starch-splitting and protein-degrading. In particular, barley malt is an important source of alpha and beta amylase, which are used in many foods, such as beer, wheat flour, and cereal to convert starch to fermentable sugars. Thus, it is essential in the sterilization of barley malt that the enzymes retain catalytic activity.

Barley is grown unprotected in open fields, and is inherently contaminated with soil bacteria and other micro-organisms. Barley malt is obtained by steeping, germinating and drying the barley kernel under conditions conducive to the development of such enzymatic activity. However, the moist conditions of the steeping operation, wherein the barley kernel is soaked in water for 3 to 5 days at 54° F., also causes an enormous increase in the microflora. Although a high bacterial population is normal to the malting process and does not create a health hazard, aesthetically it is desirable to minimize the magnitude of their presence.

It is therefore desirable to sterilize, i.e., eliminate living microorganisms from, barley malt prior to use in food products and processes, without destroying enzymatic activity.

Heretofore, other microorganisms have been destroyed by physical agents, such as heat, or by chemical substances. However, prior art procedures employing sufficient heat to destroy bacteria also inactivate enzymes, such as amylase. Furthermore, most chemicals that have bactericidal properties, e.g., those capable of destroying bacteria, also destroy enzyme activity. Such chemicals suffer from the further shortcoming of not being permitted for use in food products either because they are irritating to humans when employed at effective bactericidal concentrations or leave behind toxic residues.

2. Description of the Prior Art

U.S. Pat. No. 3,992,147 discloses the use of isopropanol in combination with hydrogen peroxide to sterilize psyllium seed husk. U.S. Pat. No. 1,992,582 discloses a method of manufacturing rolled buckwheat or buckwheat flakes by mechanically removing the outer husk from buckwheat grains and then steaming the grains with water vapor either during or after treatment with one or more of protein coagulating reagents including certain organic acids such as acetic acid or alcohols, such as methyl, ethyl, or propyl alcohols. While such procedures have been effective in sterilizing buckwheat and preventing propagation of micro-organisms during storage, where continued enzyme activity is unnecessary, those skilled in this art have considered such elevated temperature sterilization to be detrimental to barley malt in that such steaming conditions are known to inactivate the enzyme system of barley malt.

SUMMARY OF THE INVENTION

It has now been found that certain organic alcohols can be employed under ambient temperature conditions to effectively destroy bacteria, and thus sterilize previously processed barley malt, without inactivating the important enzyme system contained therein. In particular, among the alcohols which have been found to be satisfactory, i.e., methanol, ethanol, propanol and isopropanol is especially useful in that it combines desirable physical and bactericidal properties with low toxicity. It will be understood by those skilled in this art that the term "barley malt" is intended to include other forms of processed barley malt, including barley malt flour.

Those knowledgeable of enzymes would expect that a desiccated enzyme system such as that contained in barley malt would be destroyed by the application of alcohol and additionally that caking of the product would occur. However, in contrast thereto, it has been found that the amylase enzymes in barley malt continue to maintain enzyme activity following treatment with aqueous organic alcohol and the resulting product is free flowing.

While this invention is not intended to be limited to any theory of invention, one possible explanation for the ability of isopropanol to sterilize barley malt is that the alcohol successfully competes with the bacteria for moisture with the result that the bacteria become dehydrated and thus destroyed. Furthermore, tests confirm that treatment with isopropanol is effective for destruction of coliform organisms as well as mesophilic organisms.

Use of isopropanol has been found to be further advantageous in that it has both effective penetrative capacity and ease of post treatment removal so that residues are readily reduced to allowable FDA levels. Recycling of the removed isopropanol adds economy to the procedure.

Other objects and advantages of the invention will become apparent from the following detailed description.

DETAILED DESCRIPTION OF THE INVENTION

The present invention is carried out by subjecting commercially processed barley malt to ambient temperature soaking in an aqueous alcohol solution for prolonged periods of time. While it has been found that concentration of the alcohol in the aqueous solution can vary broadly, as little as a 3% solution can be effective, provided the treatment time is substantial. Although the effectiveness of the sterilization has been found to be enhanced as the concentration of the alcohol is increased, greater than 70% concentrations do not appear to provide any significant additional advantage. Similarly, treatment times can vary from ¼ to 24 hours, with the higher concentrations requiring lesser treatment times.

Although slightly elevated temperatures do not adversely affect the invention, excessive heat tends to diminish the enzymatic activity of the amylase present in the barley malt. Therefore, it is essential to maintain the temperature below about 150° F. throughout processing.

After the desired time of treatment has expired, the soaking solution is drained from the barley malt, the malt rinsed with water and dried at low temperatures not in excess of 150° F.

The following illustrates the concentrations of aqueous solutions of isopropanol and times which are effective in sterilizing barley malt.

100 gram samples of barley malt having a standard plate count of 73,000,000 bacteria/gram were treated with 300 ml. portions of 25, 50, 60 and 70% aqueous isopropanol for 19 hours at ambient temperature (75° F.). 25 gram samples prepared by each treatment were further treated as follows: water wash, water wash followed by drying in a warm air stream, and drying in a warm air stream. The samples were evaluated for a standard plate count. Data obtained are presented in Table I.

TABLE I

| Isopropanol Concentration | Standard Plate Count - Bacteria/Gram | | |
|---|---|---|---|
| | Water Wash | Water Wash & Air Dried | Air Dried |
| 25% | 180 | 80 | 60 |
| 50% | 20 | 50 | 60 |
| 60% | 50 | 60 | 420 |
| 70% | 10 | 130 | 40 |

As indicated by the data, all treatments reduce the standard plate count to well below acceptable levels, i.e., less than 100,000/gram. Diastatic power determinations of malt treated under these conditions showed no significant loss of enzyme activity.

Studies were conducted to further determine the concentration of aqueous isopropanol solution and time of treatment necessary to sterilize barley malt.

100 gram samples of barley malt having a standard plate count of 73,000,000 bacteria per gram were treated with 250 mls. of 12½, 25 and 50% aqueous isopropanol solution for 15, 30, 60 and 180 minutes at ambient temperature (75° F.). Samples were dried under warm air and evaluated for standard plate count. The results of these treatments are shown in Table II.

TABLE II

Effect of Isopropanol Treatment on Std. Plate Count of Barley Malt

| Isopropanol Solution | Exposure Time | | | |
|---|---|---|---|---|
| | 15 Min. | 30 Min. | 60 Min. | 180 Min. |
| 12½% | 4,500,000 | 3,200,000 | 1,000,000 | 290,000 |
| 25% | 34,000 | 21,000 | 5,300 | 20,000 |
| 50% | 24,700 | 23,000 | 1,600 | 110 |

Samples treated with 25 and 50% aqueous isopropanol solution were effectively sterilized in a 15 minute treatment time.

Studies were run to evaluate the bactericidal effect of aqueous isopropanol treatment of barley malt on coliform organisms present. As indicated by the results shown in Table III, aqueous isopropanol effectively destroys coliform organisms.

TABLE III

| Source of Barley Malt | Exposure Time (Minutes) | Number of Coliforms Surviving (MPN)* % Isopropanol | | | % Coliforms Surviving (MPN)* % Isopropanol | | |
|---|---|---|---|---|---|---|---|
| | | 25 | 50 | 75 | 25 | 50 | 75 |
| Brand A - Brewer's Malt | 15 | 6.7 | 1.3 | 11.8 | 0.6 | 0.1 | 1.1 |
| | 30 | 12.9 | 0.2 | 1.6 | 1.2 | 0.2 | 0.2 |
| | 60 | 0.5 | 0 | 0.6 | 0.1 | 0 | 0.1 |
| Brand B - Distiller's Malt | 15 | 19.7 | 4.6 | 3.3 | 1.1 | 0.3 | 0.2 |
| | 30 | 12.3 | 5.9 | 0.7 | 0.7 | 0.7 | 0.3 |
| | 60 | 2.1 | 3.9 | 2.2 | 0.1 | 0.2 | 0.1 |
| Brand B - Brewer's Malt | 15 | 9.9 | 24.0 | 2.0 | 0.8 | 1.8 | 0.2 |
| | 30 | 7.9 | 6.8 | 5.3 | 0.6 | 0.5 | 0.4 |
| | 60 | 1.2 | 0.6 | 0.3 | 0.1 | 0.1 | 0.2 |

*Most Probable Number.

Additional studies were conducted to determine the effect of the aqueous alcohol upon the alpha and beta amylase activity. In particular, barley malt was treated with an aqueous solution containing 70% isopropanol (by volume) at room temperature for both 1 and 24 hours. The malt was rinsed thoroughly and dried at low temperatures which did not exceed 140° F. Diastatic power determinations (employing AACC method 22-10) and using 1 gram of malt, demonstrated no significant loss of enzymatic activity. In particular, barley malt which had been subjected to the aforementioned concentrated isopropanol solution for 1 hour demonstrated a diastatic activity of 390 Brabender units, while the barley malt treated under similar circumstances for 24 hours was determined to have 410 Brabender units of activity. Untreated barley malt was determined to have 350 Brabender units of activity of diastatic activity.

For many food purposes, it is necessary that the barley malt be in flour form. The present invention provides a method for the preparation of a barley malt flour having a low bacterial count and active amylase enzymes. Barley malt is treated with aqueous isopropanol as described earlier. Subsequently, the alcohol is removed by means known to those skilled in the art and reclaimed. The alcohol treated barley malt is washed with sufficient water to insure the final product will contain isopropanol residues less than 50 ppm., dried at temperatures which will not heat inactivate the amylase enzymes, milled into flour through reduction rolls or other suitable equipment and sifted.

What is claimed is:

1. A method for the preparation of barley malt flour having enzyme activity comprising the steps of:
   treating barley malt with an aqueous solution of isopropanol for sufficient time to destroy bacteria and at a temperature below that causing heat inactivation of enzymes;
   thereafter removing said aqueous isopropanol from said alcohol treated barley malt;
   washing said alcohol treated barley malt with water to reduce isopropanol residues to less than 50 ppm.;
   exposing said alcohol treated barley malt to temperature sufficient to dry said barley malt without heat inactivating enzymes contained therein; and
   milling said alcohol treated barley malt into a flour.

2. A method in accordance with claim 1 wherein the treatment time is from ¼ to 24 hours.

3. A method in accordance with claim 1 wherein the treatment is accomplished at ambient temperature.

4. The method of claim 1 comprising treating the barley malt with a 25 to 70% aqueous solution of isopropanol for 15 to 180 minutes at a temperature below that causing heat inactivation of enzymes.

* * * * *